US012782795B2

(12) United States Patent
Lee et al.

(10) Patent No.: US 12,782,795 B2
(45) Date of Patent: Nov. 3, 2026

(54) PRIVACY CONTROL CIRCUIT FOR CAMERA SYSTEM

(71) Applicant: Microsoft Technology Licensing, LLC, Redmond, WA (US)

(72) Inventors: Jaejin Lee, Redmond, WA (US); Donghwi Kim, Kirkland, WA (US); Han Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 18/637,157

(22) Filed: Apr. 16, 2024

(65) Prior Publication Data

US 2025/0321467 A1 Oct. 16, 2025

(51) Int. Cl.
*G03B 17/18* (2021.01)
*G02F 1/29* (2006.01)

(52) U.S. Cl.
CPC ............. *G03B 17/18* (2013.01); *G02F 1/294* (2021.01)

(58) Field of Classification Search
CPC ...................................................... G03B 17/18
See application file for complete search history.

(56) References Cited

U.S. PATENT DOCUMENTS

2015/0350612 A1 12/2015 Brunson
2019/0042769 A1 2/2019 Sukhomlinov
2021/0116771 A1* 4/2021 Demuth .............. G02F 1/16757
2021/0185208 A1 6/2021 Djakovic
2022/0197110 A1 6/2022 Li

OTHER PUBLICATIONS

"Amazing Magnet Experiments / Science Experiments", Fun Science, Retrieved From: https://www.youtube.com/watch?v=w_ZqTGxtHrk.
"Webcam Cover Slide, Ultra Thin Round Hole Laptop Camera Cover Slide Blocker for Computer MacBook Pro iMac PC Tablet Notebook Surface Pro Echo Show Camera, Ultra Thin Privacy Protector", Retrieved From: https://www.amazon.com/Blocker-Computer-MacBook-Notebook-Protector%EF%BC%886/dp/B07Z9KM5QB/ref=sr_1_20?crid=2LKONRHRC1WD1&keywords=camera+cover&qid=1701727984&s=electronics&sprefix=camera+cove%2Celectronics%2C324&sr=1-20, 2024, 9 Pages.
Extended European search report received in European Application No. 25168922.0, mailed on Aug. 28, 2025, 10 pages.

* cited by examiner

*Primary Examiner* — Edmond C Lau
(74) *Attorney, Agent, or Firm* — Alleman Hall LLP

(57) ABSTRACT

A camera system includes a camera, a privacy indicator configured to indicate an activation status of the camera, and an optical camera blocker disposed between the camera and an external environment. The optical camera blocker is configured to, when activated, obscure images captured by the camera. A privacy control circuit is configured to compare a state of a first circuit trace indicative of an intended operational status of the privacy indicator with a state of a second circuit trace indicative of an actual operational status of the privacy indicator, and based at least in part on detecting a mismatch between the state of the first circuit trace and the state of the second circuit trace, activate the optical camera blocker.

20 Claims, 9 Drawing Sheets

PRIVACY CONTROL CIRCUIT FOR CAMERA SYSTEM

BACKGROUND

Some computing devices include integrated camera systems, which are useable to capture images of a surrounding environment while the computing device is in use. Some such camera systems include privacy indicators, which are used to indicate the activation status of the camera. For instance, an LED may be activated to emit light while the camera is active.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera system includes a camera, a privacy indicator configured to indicate an activation status of the camera, and an optical camera blocker disposed between the camera and an external environment. The optical camera blocker is configured to, when activated, obscure images captured by the camera. A privacy control circuit is configured to compare a state of a first signal trace indicative of an intended operational status of the privacy indicator with a state of a second circuit trace indicative of an actual operational status of the privacy indicator, and based at least in part on detecting a mismatch between the state of the first circuit trace and the state of the second circuit trace, activate the optical camera blocker.

DETAILED DESCRIPTION

Electronic devices with built-in camera systems are ubiquitous and are used for a wide variety of purposes, from video conferencing to biometric authentication. However, the privacy and security of these devices can potentially be compromised—e.g., in some cases, it may be possible for a malicious attacker to gain control over a user's camera without their knowledge or permission. Traditional approaches to mitigating these risks have included software-based solutions and physical camera covers. However, software solutions are potentially vulnerable to bypassing through malware or hacking, and physical covers do not address the root of the security vulnerability and can be inconvenient for users.

The problem is further compounded by the design of camera privacy indicators in electronic devices. For instance, a computing device may include a privacy indicator (such as an LED) that activates when the camera is active, warning the user that their camera is in use. However, these privacy indicators are often controlled by unsecured general-purpose input/output (GPIO) pins. These pins can be susceptible to manipulation, allowing the camera to remain active without triggering the privacy indicator, and thus not alerting the user to unauthorized use. Furthermore, in some examples, the privacy indicator may activate when the camera is not being used—e.g., while the computing device boots, or while new firmware is being flashed to the camera control logic, which can be concerning and misleading for the user.

The present disclosure is therefore directed to systems and techniques for improving the security of camera privacy indicator control within electronic devices. Specifically, the present disclosure describes a camera system including a camera, a privacy indicator configured to indicate an activation status of the camera, and an optical camera blocker disposed between the camera and an external environment. When activated, the optical camera blocker obscures images captured by the camera. Non-limiting examples of optical camera blockers will be described in more detail below. The optical camera blocker is controlled by a privacy control circuit, which activates the optical camera blocker based at least in part on a detected mismatch between two different circuit traces, one indicating the intended operational status of the privacy indicator, and another indicating the actual operational status of the privacy indicator. Such a mismatch may be indicative of a potential hacking attempt, and thus triggers activation of the optical camera blocker.

In this manner, the techniques described herein beneficially enhance the privacy and security of camera systems by implementing a hardware-based privacy control mechanism. This system addresses the limitations of existing solutions by providing secure, efficient, and user-friendly means of protecting against unauthorized camera access, thus significantly improving the privacy and security of such devices.

Figure 1:
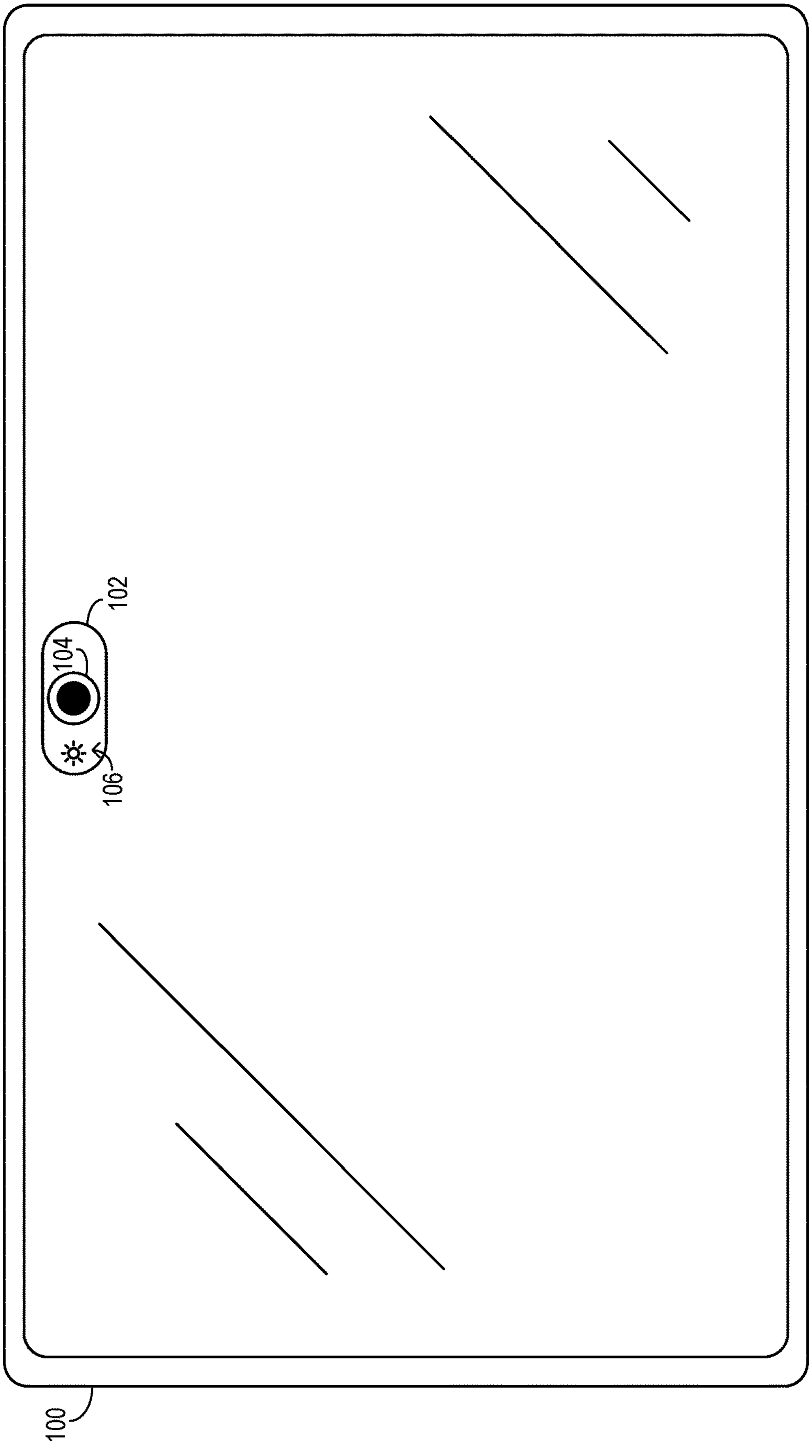
FIG. 1 schematically shows an example computing device including an integrated camera system.

FIG. 1 schematically shows an example computing device 100 having an integrated camera system 102. In this example, the computing device has a tablet computer form factor. Furthermore, in this example, the camera system is integrated into the computing device. However, the specific configuration and appearance of computing device 100 depicted in FIG. 1 is non-limiting and highly simplified for the sake of explanation.

In general, the techniques described herein may be applied to any suitable camera system. Such a camera system may in some cases be integrated into a computing device (e.g., such as a smartphone, tablet, laptop, etc.), or may be a standalone camera system (such as a handheld camera or webcam) that can be used on its own, and/or communicatively coupled with a separate computing device. In some examples, a camera system as described herein may be integrated into, controlled by, and/or implemented as computing system 900 described below with respect to FIG. 9.

In FIG. 1, camera system 102 includes a camera 104 and a privacy indicator 106. The camera is useable to capture images of a surrounding environment. For instance, in some examples, the camera may be used to capture images (e.g., video frames) of a user of the computing device, such as in a filming or live-streaming scenario. In general, the camera can have any suitable hardware configuration and imaging properties. For instance, the camera may have any suitable image sensor size and type, pixel resolution, optical configuration (e.g., lens size, shape), wavelength sensitivity (e.g., visible light, infrared light, ultraviolet light), etc. In some examples, the camera system includes two or more different cameras, which may have the same or different properties.

Furthermore, the privacy indicator may take any suitable form, and may indicate activity of the camera system in any suitable way. In this example, privacy indicator 106 includes a light emitting diode (LED). When the camera is active, the privacy indicator may cause the LED to emit light and thereby indicate that the camera is in use. Such light may be emitted continuously, in a blinking pattern, and/or in any other suitable way. While an LED is used in this example, it will be understood that any additional or alternative components may be used to indicate the status of the camera. For instance, in some examples, the privacy indicator may include other types of light-emitting devices, audio output devices, physical mechanisms (e.g., switches, buttons) that change position based on camera activity, etc.

It is generally desirable for the privacy indicator to activate only when the camera is in use—e.g., when the camera is actively receiving and processing light from a surrounding environment to generate digital images. This can serve as a warning to any humans in the vicinity that the camera is active, and therefore that they are potentially being imaged by the camera. Similarly, it is generally desirable for the privacy indicator to be activated only when the camera is in use—e.g., to avoid alarming users with the false impression that the camera is active. However, as discussed above, conventional camera system designs can permit scenarios where the activity of the privacy indicator is not synchronized with activity of the camera. For instance, malicious hacking activity could potentially result in activation of the camera without corresponding activation of the privacy indicator. Similarly, the privacy indicator may in some cases be activated when the camera is not—e.g., when the device boots, or when new firmware is installed.

Figure 2:
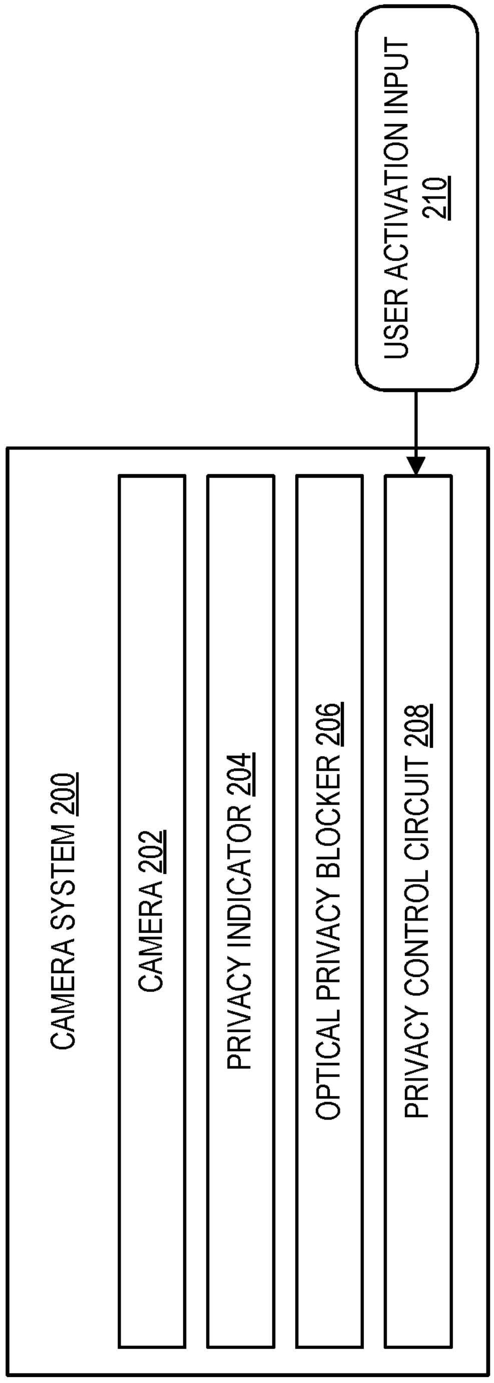
FIG. 2 schematically depicts components of an example camera system.

Accordingly, FIG. 2 schematically depicts aspects of an example camera system 200 that uses a hardware-based design to improve camera privacy and security. As shown, camera system 200 includes a camera 202 and a privacy indicator 204. The privacy indicator is configured to indicate the activation status of the camera, as discussed above. Additionally, camera system 200 includes an optical camera blocker 206. The optical camera blocker is disposed between the camera and the external environment and is configured to, when activated, obscure images captured by the camera. In general, the optical camera blocker takes the form of any suitable computer-controllable mechanism or component useable to allow normal imaging under some circumstances but obscure the camera imagery under other circumstances. This can include blocking at least a portion of light from the external environment from reaching the image sensor of the camera, reducing the transparency of a medium through which the light passes, changing the focus of the light (e.g., to blur a resulting image), etc. Non-limiting examples of suitable optical camera blockers will be described in more detail below with respect to FIGS. 4A and 4B, 5A and 5B, 6A and 6B, and 7A and 7B.

Furthermore, in FIG. 2, camera system 200 includes a privacy control circuit 208. One example configuration of the privacy control circuit will be schematically illustrated and described in more detail with respect to FIG. 3. In general, the privacy control circuit serves to activate the optical camera blocker in response to one or more circuit criteria being detected. As will be described in more detail below, this may include detecting a mismatch between the state of a first circuit trace indicative of intended operation of the privacy indicator, and the state of a second circuit trace indicative of actual operation of the privacy indicator. Such a mismatch may be indicative of a potential hacking attempt.

The present disclosure primarily focuses on cases where the optical camera blocker is activated by the privacy control circuit in response to detecting certain circuit conditions indicative of potential hacking. However, in some examples, the optical camera blocker may additionally be activated in other circumstances. For instance, in FIG. 2, the camera system receives a user activation input 210 that causes the privacy control circuit to activate the optical camera blocker. The user activation input may have any suitable source and may be provided in any suitable way. In examples where the camera system is integrated into, or otherwise controlled by, a computing device, then the user activation input may be provided to the camera system by the computing device. For instance, the computing device may generate the user activation input in response to a user interacting with a software application (such as a videoconferencing application, a settings application, a privacy control application, etc.). Additionally, or alternatively, the user activation input may be generated in response to the user providing input to the camera system itself—e.g., pressing a button, actuating a switch, touching a touch-sensitive surface, etc. In this manner, a human user may manually trigger activation of the optical camera blocker, which can beneficially provide the user with enhanced peace of mind in cases where they are concerned about potential misuse of the camera.

Figure 3:
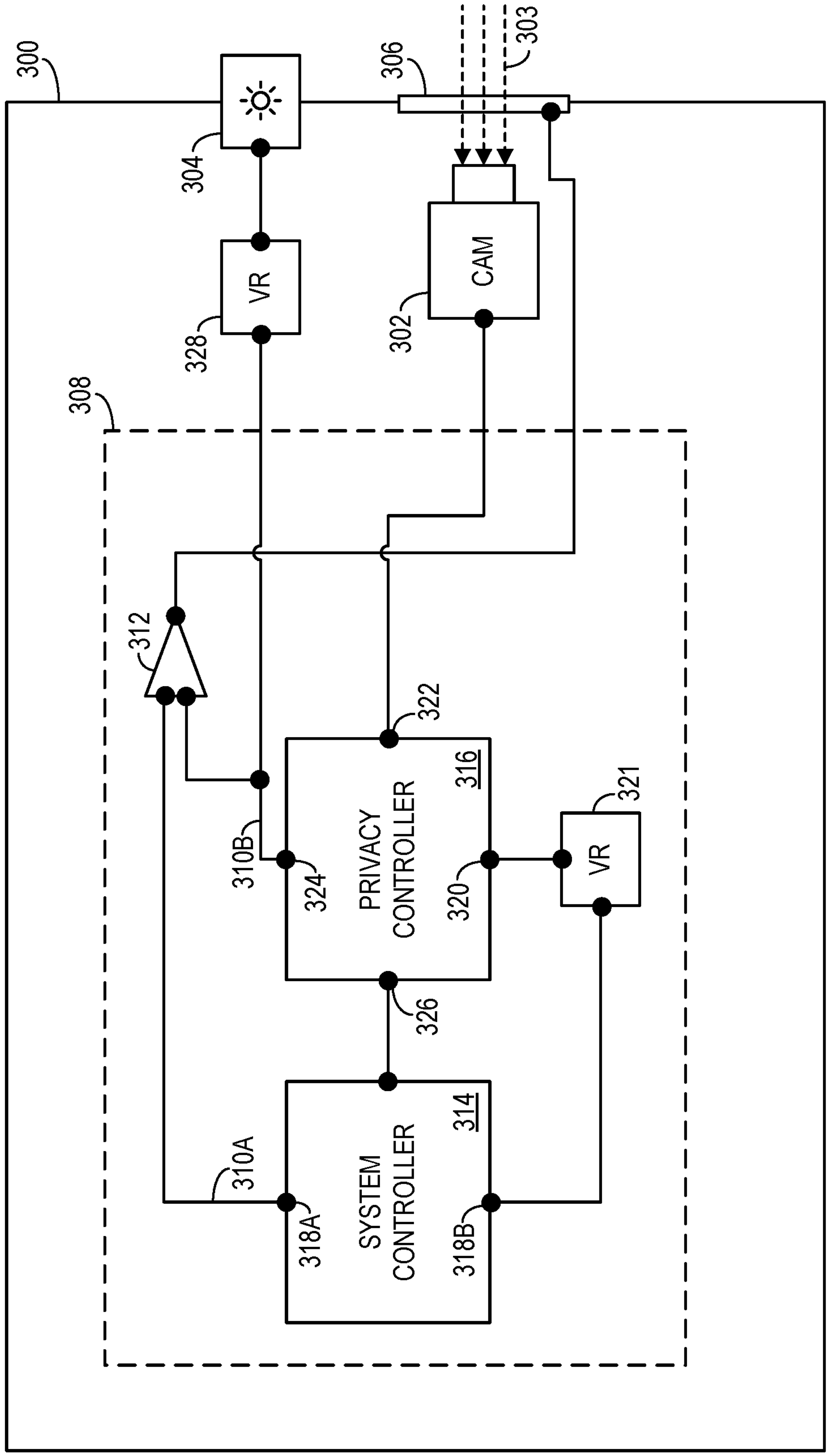
FIG. 3 schematically depicts example components of a privacy control circuit of a camera system.

FIG. 3 schematically depicts another example camera system 300. As shown, the camera system includes a camera 302 that receives image light 303 from an external environment, and is thereby useable to capture images of the external environment. Camera system 300 additionally includes a privacy indicator 304 configured to indicate the activity of camera 302. An optical camera blocker 306 is disposed between camera 302 and the external environment, and is useable to obscure images captured by the camera (e.g., by blocking, blurring, and/or otherwise affecting at least some of the image light 303 from the external environment).

In this example, the operation of the camera, privacy indicator, and optical camera blocker are controlled by privacy control circuit 308. It will be understood that the specific configuration and subcomponents of privacy control circuit 308 are simplified and non-limiting. In general, a "privacy control circuit" refers to any suitable combination of circuit components (e.g., controllers, logic gates, voltage regulators) useable to activate an optical camera blocker based on a comparison between two different circuit traces, each relating to activity of the privacy indicator.

Specifically, in FIG. 3, two different circuit traces are labeled as first circuit trace 310A and second circuit trace 310B. The first circuit trace 310A is indicative of an intended operational status of the privacy indicator, while the second circuit trace 310B is indicative of an actual operational status of the privacy indicator. Each of these circuit traces can have one of two different states, corresponding to a digital zero and a digital one. It will be understood that any suitable underlying voltage values may correspond to digital zero and digital one, depending on the implementation. The states of these two circuit traces are compared by a comparator 312 of the privacy control circuit. The optical camera blocker 306 is controlled based on the output of the comparator. Use of a comparator may beneficially enable comparison between the two circuit lines in a way that is simple, low-power, and cost-effective. It will be understood that in other examples, any suitable computer circuit components may be used to compare the states of the first and second circuit traces, in addition to or instead of the comparator.

In some examples, the optical camera blocker is inactive whenever the output from the comparator is low, which may occur whenever the states of the first and second circuit traces are the same (e.g., both are low or both are high). However, in cases where the states of the first and second circuit traces are different (e.g., one is low and one is high), this may cause the output of the comparator to go high, which then causes activation of the optical camera blocker to obscure any imagery captured by the camera. In other examples, the optical camera blocker may be active when the output of the comparator is low, and inactive when the output is high.

The states of the first and second circuit traces are controlled by any suitable components of the privacy control circuit. In FIG. 3, the privacy control circuit includes a system controller 314, which controls the state of the first circuit trace. This may, for instance, take the form of a System on Chip (SoC), Power Management Integrated Circuit (PMIC), Embedded Controller (EC), or other suitable computer logic component. In FIG. 3, the privacy control circuit additionally includes a privacy controller 316, which is configured to control the state of the second circuit trace 310B. As with the security controller, the privacy controller may be implemented as any suitable computer logic component. In some examples, either or both of security controller 314 and privacy controller 316 may be implemented as logic subsystem 902 described below with respect to FIG. 9.

This configuration stands in contrast to other camera systems, where a single system controller (e.g., SoC) is sometimes used to directly activate both the camera and the privacy indicator. In such systems, circuit traces supplying activation signals and/or electrical power to the camera and the privacy indicator may be coupled to different interconnects of the system controller. For instance, each of the camera and the privacy indicator may be controlled by different general-purpose input/output (GPIO) pins of the system controller. In normal operation, the outputs of these GPIO pins are synchronized—e.g., when one pin is used to activate the camera, another pin is used to activate the privacy indicator. However, as discussed above, such systems can potentially be prone to scenarios where the activity of the camera is not synchronized with activity of the privacy indicator—e.g., due to malicious tampering with the unsecured GPIO pins.

Nonetheless, in some examples, the privacy control circuit 308 described herein is beneficially useable with system controllers configured for use in other camera systems, where the system controller directly controls the camera and privacy indicator. In FIG. 3, the first circuit trace is coupled with a first power output interconnect 318A of the system controller, and thus the state of the first circuit trace is controlled by power output interconnect 318A. This may, for instance, take the form of a GPIO pin, or other suitable interconnect of a computer logic component (e.g., conductive pad, via, bump), that would ordinarily be used to directly control the state of the privacy indicator. In this example, however, the first circuit trace does not directly cause activation of the privacy indicator, but rather expresses the intended operational status of the privacy indicator (e.g., as intended by the system controller).

Instead, in this example, activation of the privacy indicator is caused by the state of the second circuit trace (e.g., by providing an activation signal and/or electrical power to the privacy indicator). The state of the second circuit trace is controlled by privacy controller 316, which is separate from the system controller 314. In this example, a second power output interconnect 318B of the system controller is used to supply to the privacy controller. The second power output interconnect of the system controller may correspond to an interconnect that would ordinarily be used to directly control the activation state of the camera (e.g., by supplying power to the camera) if the system controller was integrated into a different camera system. However, in this case, the second power interconnect is used to provide power to, and activate, the privacy controller. In this manner, the privacy controller is associated with a separate power domain that is secured and gated by the privacy controller, and thus is resilient to any hacking attempts targeting the system controller. This beneficially improves the security with which the camera and privacy indicator are controlled.

As shown, the privacy controller includes a power input interconnect 320 that receives power from the system controller. In this example, the voltage of the power delivered to the privacy controller is controlled by a voltage regulator 321. It will be understood that the privacy circuit may include any suitable power control components (e.g., voltage regulators and/or other components) configured to control the amount and type of electrical power provided to different elements of the privacy circuit.

Additionally, in this example, the privacy controller includes a camera power interconnect 322 used to supply power to, and thereby activate, the camera 302. The camera power interconnect is used to supply power to the camera based at least in part on the privacy controller detecting a rising edge at the power input interconnect—e.g., indicative of an activation signal and/or power delivery from the system controller.

Furthermore, in this example, the privacy controller includes an indicator power interconnect 324 that controls the state of the second circuit trace. Power delivery via the camera power interconnect 322 is synchronized with power delivery via the indicator power interconnect 324. In this manner, when power is provided to activate the camera, power is additionally provided to activate the privacy indicator, and thus the privacy indicator correctly indicates the activation status of the camera. Such synchronization may be achieved in any suitable way—e.g., in some cases the camera power interconnect and indicator power interconnect are internally tied within the privacy controller, such that the state of one interconnect is synchronized with the state of the other interconnect. This beneficially ensures that the privacy indicator is always active whenever the camera is active, serving as a reliable indicator to the user of camera activity.

As discussed above, in some examples, the privacy controller activates the camera and privacy indicator based at least in part on detecting a rising edge at the power input interconnect. However, in some examples, the privacy controller may refrain from supplying power to the camera and privacy indicator until a predetermined delay has elapsed. This can beneficially alleviate scenarios where the privacy indicator is activated even when the camera is not in use—e.g., during device boot and/or firmware flashing, when the power output interconnects of the system controller are driven high.

More particularly, upon detecting a first rising edge at the power input interconnect after a reset condition, the privacy controller may wait to supply power to the camera until after a predetermined delay has elapsed. A "reset condition" may refer to any suitable condition. In some cases, a reset condition may be indicated by the state of a system reset interconnect 326 of the privacy controller, which may be controlled at least in part by the system controller. For instance, when the device boots, the reset condition may be triggered (e.g., as indicated by the system reset interconnect going high), and thus the privacy controller may refrain from activating the camera and privacy indicator in response to the first rising edge detected at the power input interconnect, until after the predetermined delay has elapsed. Any suitable delay period may be used, and the delay may in some cases be configurable. As one non-limiting example, the predetermined delay may be equal to ten seconds. This can beneficially prevent scenarios where the privacy indicator is activated even when the camera is not active, thus improving human-computer interaction by reducing the risk that the user receives a "false alarm" that their camera is active. After detecting the first rising edge after the reset condition, the privacy controller may activate the camera and privacy indicator in response to subsequent rising edges at the power input interconnect without waiting for the predetermined delay to elapse, until another reset condition has been detected.

As shown, the state of the second circuit trace 310B is controlled by the indicator power interconnect 324 of the privacy controller. This second circuit trace is an input to comparator 312, and also controls the state of the privacy indicator 304. In this example, the privacy indicator is activated by a voltage regulator 328, and the voltage regulator is controlled by the state of the second circuit trace. However, as discussed above, the privacy control circuit may include any suitable number and variety of different power regulation components (such as voltage regulators) configured to control the amount of electrical power provided to different circuit elements, and the properties of such electrical power.

In any case, as discussed above, the states of the first circuit trace 310A and the second circuit trace 310B are compared—e.g., by comparator 312. In cases where the states of the first and second circuit traces match (e.g., where both the intended state and the actual state of the privacy indicator are the same), then the optical camera blocker may be inactive. However, in cases where there is a mismatch between the states of the first and second circuit traces (e.g., one is low and the other is high), the optical camera blocker may be activated to obscure any images captured by the camera. This may, for instance, occur in cases where a malicious attacker is controlling the state of the first power output interconnect 318A of the system controller—e.g., intending to keep the privacy indicator inactive while activating the camera. Similarly, in cases where the state of the first circuit trace is high but the state of the second circuit trace is low (e.g., caused by the privacy controller waiting a predetermined delay while the device boots or firmware is flashed), this mismatch may cause activation of the optical camera blocker until the mismatch resolves.

Figure 4B:
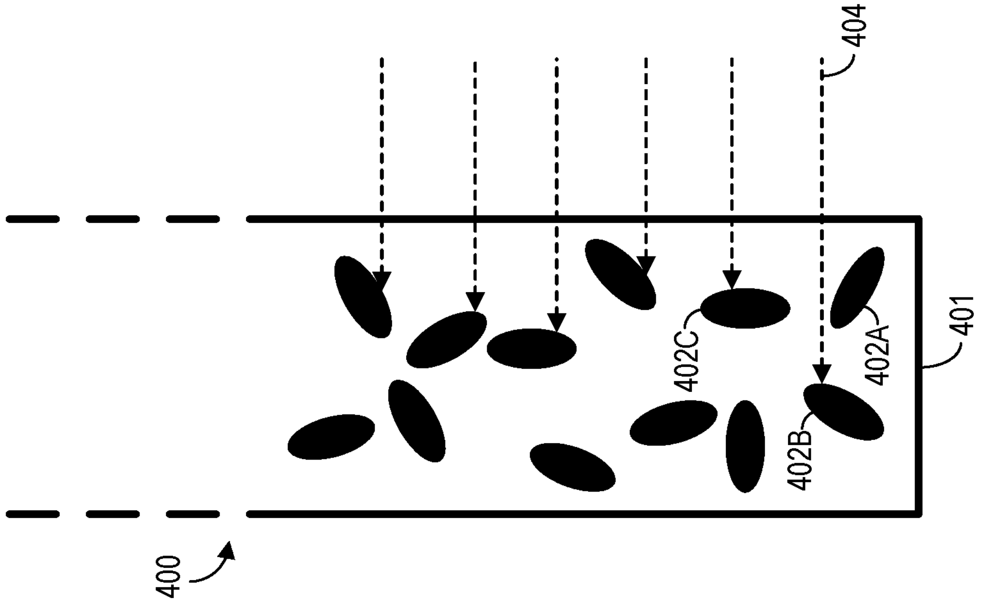
FIGS. 4A and 4B schematically illustrate the operation of an example optical camera blocker.
Figure 4A:
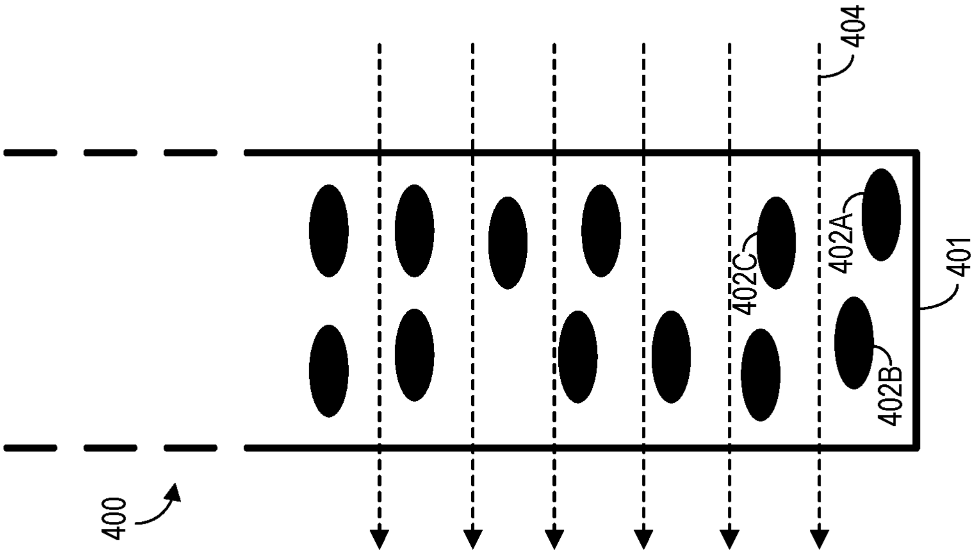

Non-limiting examples of suitable optical camera blockers will now be described with respect to FIGS. 4A and 4B, 5A and 5B, 6A and 6B, and 7A and 7B. Specifically, FIGS. 4A and 4B schematically show aspects of an example optical camera blocker 400. In this example, the optical camera blocker includes a liquid crystal film 401. This may, for instance, be implemented as a polymer network liquid crystal (PNLC), which includes a plurality of polymers dispersed within a matrix. Some of these polymers are labeled in FIGS. 4A and 4B as polymers 402A-C.

In the state depicted in FIG. 4A, electrical conditions of the liquid crystal film cause alignment of the polymers (e.g., through electromagnetic effects), and this alignment enables light 404 to pass through the optical camera blocker towards the camera. This may, for instance, represent an inactive state of the optical camera blocker, in which operation of the camera is substantially unimpeded by the optical camera blocker. By contrast, FIG. 4B depicts a state where the electrical conditions of the liquid crystal film has changed the arrangement of polymers within the matrix, increasing the opacity of the liquid crystal film and blocking at least a portion of the light 404 from passing through the optical camera blocker. This may, for instance, correspond to an activate state of the optical camera blocker, where images captured by the camera are obscured.

Figure 5A:
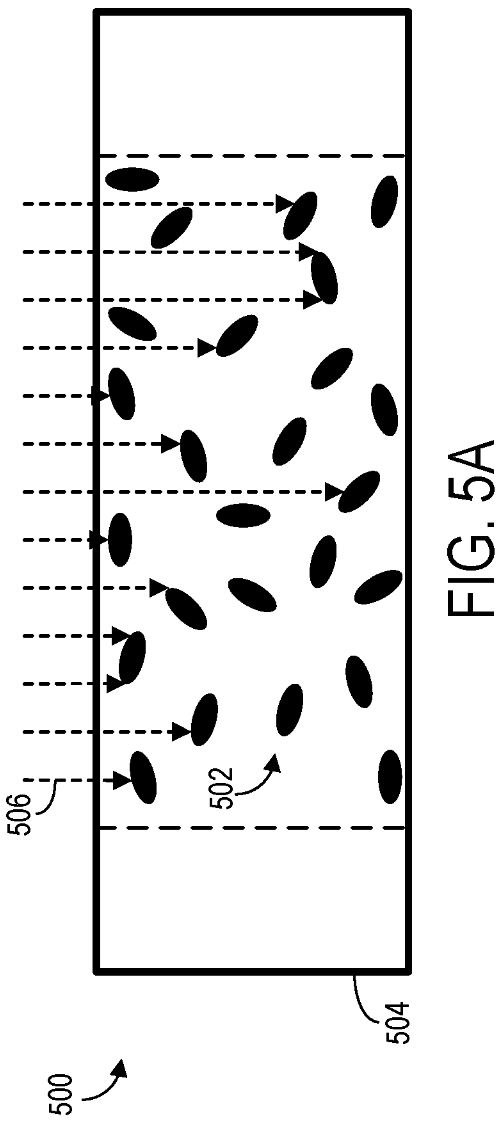
FIGS. 5A and 5B schematically illustrate the operation of another example optical camera blocker.
Figure 5B:
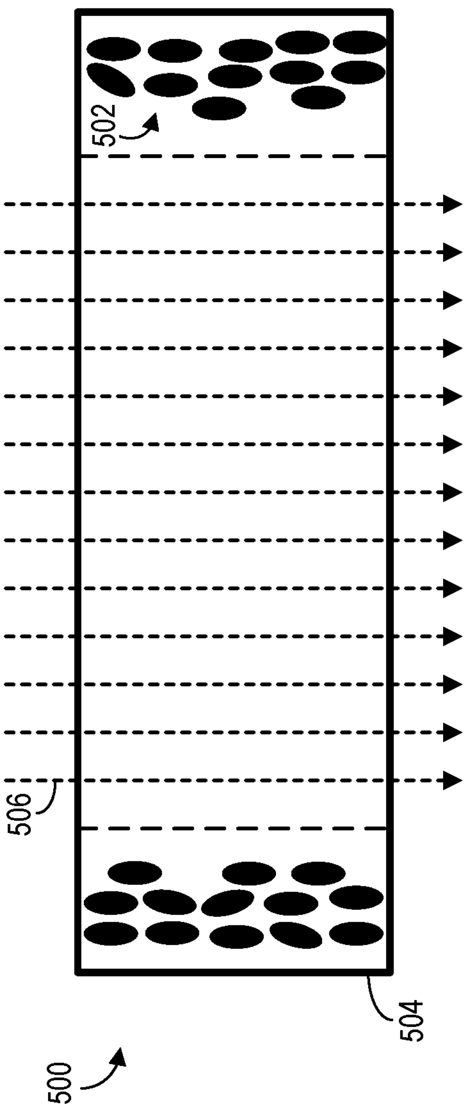

Another example optical camera blocker 500 is schematically depicted with respect to FIGS. 5A and 5B. In this example, the optical camera blocker includes a plurality of particles 502 dispersed within a liquid chamber 504. The particles may take any suitable form—e.g., they may be constructed from any suitable material that can be controllably dispersed by application of suitable electrical and/or magnetic fields in the vicinity of the liquid chamber. Similarly, the liquid chamber may include liquid having any suitable composition.

Activation of the optical camera blocker changes the distribution of the particles in the liquid chamber—e.g., to change the opacity of the liquid chamber. In the scenario depicted in FIG. 5A, the particles are dispersed throughout the liquid chamber, and thus block at least a portion of the light 506 entering the optical camera blocker from the external environment. Thus, this may correspond to an active state of the optical camera blocker, where imagery captured by the camera is obscured. By contrast, in FIG. 5B, electrical conditions applied to the liquid chamber have caused the plurality of particles to congregate at the ends of the liquid chamber, allowing the light 506 to pass through the liquid chamber substantially unimpeded.

The particle distributions depicted in FIGS. 5A and 5B may be achieved through the application of any suitable electrical and/or magnetic fields. For instance, to generate the conditions depicted in FIG. 5B, same field polarity may be applied to the liquid chamber by field generators (e.g., magnetic coils, electric plates). Once the particles are collected, the generators may be turned off. To generate the conditions depicted in FIG. 5A, opposite field polarity may be applied to the liquid chamber by the field generators to redisperse the particles throughout the liquid chamber.

Figure 6A:
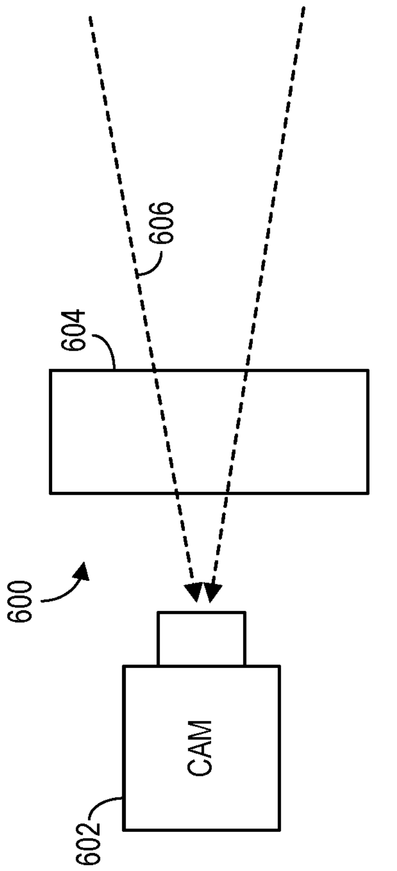
FIGS. 6A and 6B schematically illustrate the operation of another example optical camera blocker.
Figure 6B:
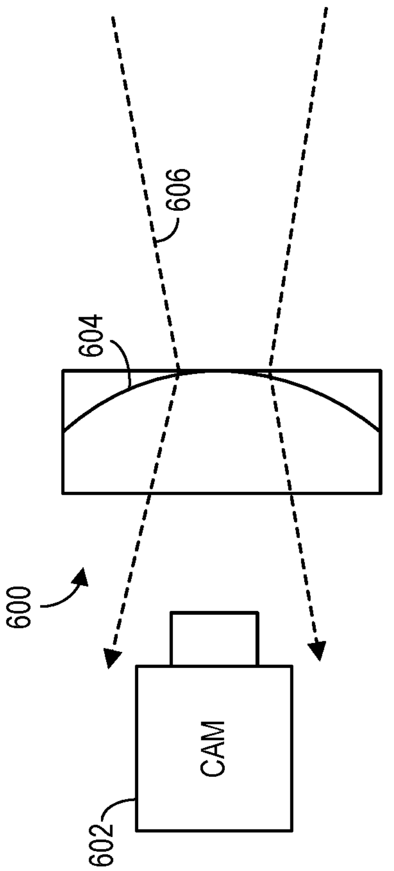

Another example optical camera blocker 600 is schematically depicted with respect to FIGS. 6A and 6B. In this example, the optical camera blocker includes a dynamically controllable electro-optic lens 604, which affects the light 606 traveling from the external environment toward a camera 602. When activated, the lens changes the focus applied to the light entering the camera from the external environment. In the scenario depicted in FIG. 6A, the lens focuses the light toward the camera, resulting in a relatively clear image. This may correspond to an inactive state of the optical camera blocker. By contrast, in FIG. 6B, the lens has been controlled to change the focus of the light as it passes through the lens, resulting in a blurred image. This may correspond to an active state of the optical camera blocker, thereby obscuring any captured images.

The dynamically controllable electro-optic lens may be implemented in any suitable way. As one non-limiting example, the focus of the lens may be changed through electrowetting, which modifies the voltage applied between different conducting fluids in the lens. This results in a change in the height of the liquid lens, thereby affecting the focus applied by the lens. As additional non-limiting examples, an electro-optic lens may be implemented as a liquid crystal lens, a piezoelectric lens, a deformable mirror lens, etc.

Figure 7A:
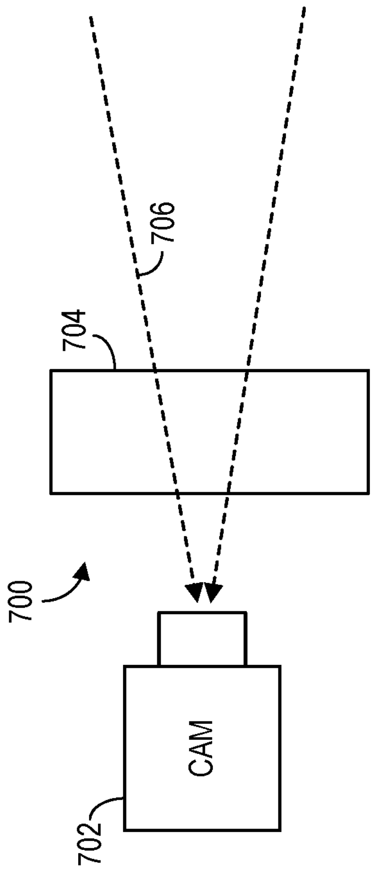
FIGS. 7A and 7B schematically illustrate the operation of another example optical camera blocker.
Figure 7B:
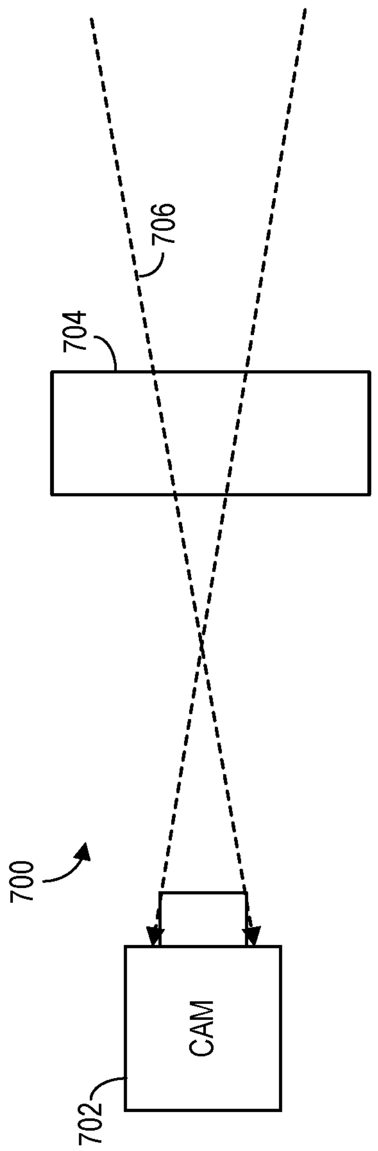

Additionally, or alternatively, an optical camera blocker may be implemented by changing the distance between a lens and the camera. This is schematically illustrated with respect to FIGS. 7A and 7B, showing another optical camera blocker 700. In this example, the optical camera blocker includes a lens 704, which affects the light 706 traveling from the external environment toward a camera 702. The lens 704 may in some cases be an electro-optic lens, as is the case in FIGS. 6A and 6B, or may take another suitable form. In the scenario depicted in FIG. 7A, the lens has a first position with respect to the camera, which focuses the light toward the camera, resulting in a relatively clear image. By contrast, in FIG. 7B, the position of the lens with respect to the camera has been changed, resulting in a blurred image. This may correspond to an active state of the optical camera blocker, thereby obscuring any captured images. Any suitable mechanism may be used to change the position of the lens relative to the camera.

It will be understood that the examples of optical camera blockers shown in FIGS. 4A-7B are highly simplified and non-limiting. In other examples, any suitable additional or alternative optical camera blockers may be used. Furthermore, in some examples, two or more different optical camera blockers may be used together—e.g., for redundancy or enhanced security.

Figure 8:
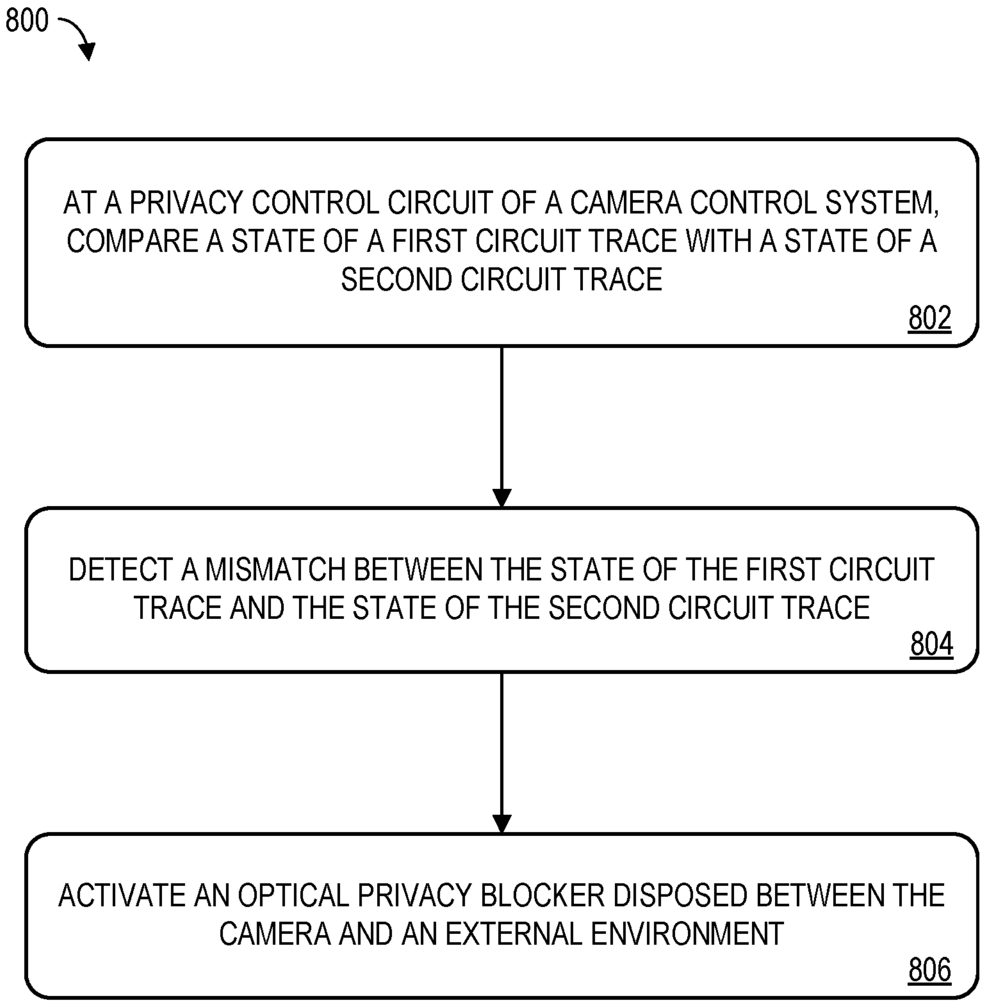
FIG. 8 illustrates an example method for camera privacy control.

FIG. 8 illustrates an example method for camera privacy control. Steps of method 800 may be implemented using any suitable computer circuit components—e.g., method 800 may be implemented through a privacy control circuit of a camera system, as discussed above. In some examples, method 800 may be implemented by computing system 900 described below with respect to FIG. 9.

At 802, method 800 includes, at a privacy control circuit, comparing a state of a first circuit trace with a state of a second circuit trace. As discussed above, the state of the first circuit trace is indicative of the intended operational state of a privacy indicator (e.g., as determined by a system controller, such as an SoC), while the state of the second circuit trace is indicative of the actual operational state of the privacy indicator (e.g., as determined by a privacy controller that is separate from the system controller).

At 804, method 800 includes detecting a mismatch between the state of the first circuit trace and the state of the second circuit trace. For instance, the state of one circuit trace may be high, while the other circuit trace is low, indicating an inconsistency between the system controller and the privacy controller. As discussed above, this situation may arise for various reasons—e.g., due to potential hacking attempts at the system controller, or due to changes in the circuitry caused by device booting or firmware flashing.

At 806, method 800 includes activating an optical camera blocker disposed between the camera and the external environment. The optical camera blocker, when active, affects light passing from the external environment toward the camera, and thus obscures any images captured by the camera. Non-limiting examples of suitable optical camera blockers include liquid crystal films, particles dispersed in a liquid chamber, electro-optic lenses, etc.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
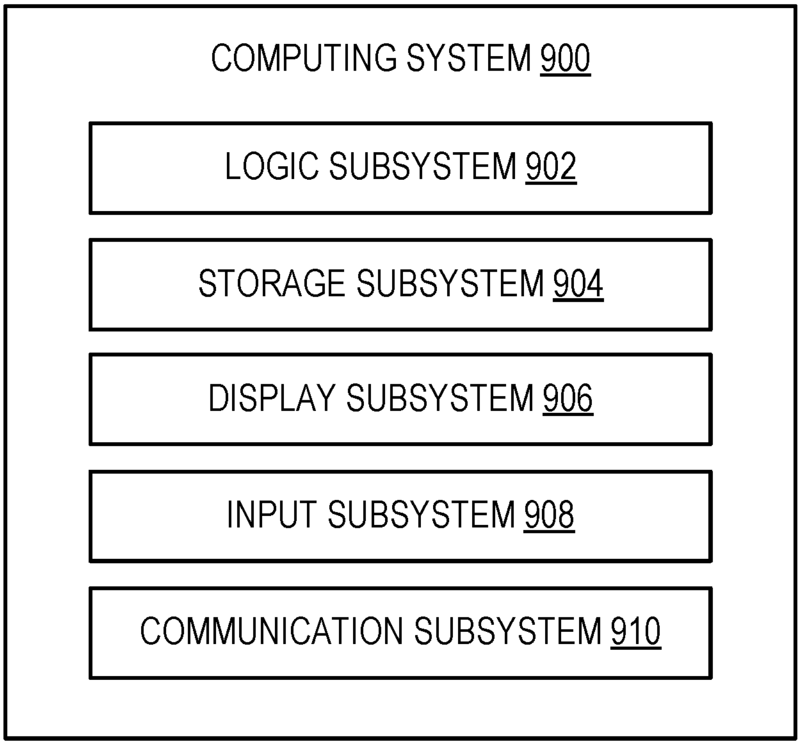
FIG. 9 schematically shows an example computing system.

FIG. 9 schematically shows a simplified representation of a computing system 900 configured to provide any to all of the compute functionality described herein. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a camera system comprises: a camera; a privacy indicator configured to indicate an activation status of the camera; an optical camera blocker disposed between the camera and an external environment, the optical camera blocker configured to, when activated, obscure images captured by the camera; and a privacy control circuit configured to: compare a state of a first circuit trace indicative of an intended operational status of the privacy indicator with a state of a second circuit trace indicative of an actual operational status of the privacy indicator; and based at least in part on detecting a mismatch between the state of the first circuit trace and the state of the second circuit trace, activate the optical camera blocker. In this example or any other example, the privacy control circuit includes a system controller configured to control the state of the first circuit trace, and includes a privacy controller configured to control the state of the second circuit trace. In this example or any other example, the first circuit trace is coupled with a first power output interconnect of the system controller, and wherein a second power output interconnect of the system controller is used to supply power to the privacy controller. In this example or any other example, the privacy controller includes a power input interconnect and a camera power interconnect, and wherein the camera power interconnect is used to supply power to the camera based at least in part on the privacy controller detecting a rising edge at the power input interconnect. In this example or any other example, upon detecting a first rising edge at the power input interconnect after a reset condition, the privacy controller waits to supply power to the camera until after a predetermined delay has elapsed. In this example or any other example, the privacy controller includes an indicator power interconnect that controls the state of the second circuit trace, and wherein power delivery via the camera power interconnect is synchronized with power delivery via the indicator power interconnect. In this example or any other example, the privacy indicator is activated by a voltage regulator of the camera system, and wherein the voltage regulator is controlled by the state of the second circuit trace. In this example or any other example, the privacy control circuit includes a comparator configured to compare the state of the first circuit trace to the state of the second circuit trace. In this example or any other example, the privacy control circuit is further configured to activate the optical camera blocker in response to a user activation input. In this example or any other example, the optical camera blocker includes a liquid crystal film, and wherein activation of the optical camera blocker increases an opacity of the liquid crystal film. In this example or any other example, the optical camera blocker includes a plurality of particles dispersed within a liquid chamber, and wherein activation of the optical camera blocker changes a distribution of the particles in the liquid chamber. In this example or any other example, the optical camera blocker includes a dynamically controllable electro-optic lens that, when activated, changes a focus applied to light entering the camera from the external environment. In this example or any other example, the privacy indicator includes a light emitting diode (LED).

In an example, a method for camera privacy control comprises: at a privacy control circuit of a camera system, comparing a state of a first circuit trace indicative of an intended operational status of a privacy indicator with a state of a second circuit trace indicative of an actual operational status of the privacy indicator, wherein the privacy indicator is configured to indicate an activation status of a camera;

detecting a mismatch between the state of the first circuit trace and the state of the second circuit trace; and activating an optical camera blocker of the camera system disposed between the camera and an external environment, the optical camera blocker configured to, when activated, obscure images captured by the camera. In this example or any other example, the privacy control circuit includes a system controller configured to control the state of the first circuit trace, and includes a privacy controller configured to control the state of the second circuit trace. In this example or any other example, upon detecting a first rising edge after a reset condition at a power input interconnect of the privacy controller, the privacy controller waits to supply power to the camera until after a predetermined delay has elapsed. In this example or any other example, the optical camera blocker includes a liquid crystal film, and wherein activation of the optical camera blocker increases an opacity of the liquid crystal film. In this example or any other example, the optical camera blocker includes a plurality of particles dispersed within a liquid chamber, and wherein activation of the optical camera blocker changes a distribution of the particles in the liquid chamber. In this example or any other example, the optical camera blocker includes a dynamically controllable electro-optic lens that, when activated, changes a focus applied to light entering the camera from the external environment.

In an example, a camera system comprises: a camera; a privacy light emitting diode (LED) configured to indicate an activation status of the camera; an optical camera blocker disposed between the camera and an external environment, the optical camera blocker configured to, when activated, obscure images captured by the camera; and a privacy control circuit configured to: compare a state of a first circuit trace indicative of an intended operational status of the privacy LED with a state of a second circuit trace indicative of an actual operational status of the privacy LED, wherein the privacy control circuit includes a system controller configured to control the state of the first circuit trace, and includes a privacy controller configured to control the state of the second circuit trace; and based at least in part on detecting a mismatch between the state of the first circuit trace and the state of the second circuit trace, activate the optical camera blocker.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera system, comprising:
- a camera;
- a privacy indicator configured to indicate an activation status of the camera;
- an optical camera blocker disposed between the camera and an external environment, the optical camera blocker configured to, when activated, obscure images captured by the camera; and
- a privacy control circuit configured to:
  - compare a state of a first circuit trace indicative of an intended operational status of the privacy indicator with a state of a second circuit trace indicative of an actual operational status of the privacy indicator; and
  - based at least in part on detecting a mismatch between the state of the first circuit trace and the state of the second circuit trace, activate the optical camera blocker.

2. The camera system of claim 1, wherein the privacy control circuit includes a system controller configured to control the state of the first circuit trace, and includes a privacy controller configured to control the state of the second circuit trace.

3. The camera system of claim 2, wherein the first circuit trace is coupled with a first power output interconnect of the system controller, and wherein a second power output interconnect of the system controller is used to supply power to the privacy controller.

4. The camera system of claim 3, wherein the privacy controller includes a power input interconnect and a camera power interconnect, and wherein the camera power interconnect is used to supply power to the camera based at least in part on the privacy controller detecting a rising edge at the power input interconnect.

5. The camera system of claim 4, wherein, upon detecting a first rising edge at the power input interconnect after a reset condition, the privacy controller waits to supply power to the camera until after a predetermined delay has elapsed.

6. The camera system of claim 4, wherein the privacy controller includes an indicator power interconnect that controls the state of the second circuit trace, and wherein power delivery via the camera power interconnect is synchronized with power delivery via the indicator power interconnect.

7. The camera system of claim 1, wherein the privacy indicator is activated by a voltage regulator of the camera system, and wherein the voltage regulator is controlled by the state of the second circuit trace.

8. The camera system of claim 1, wherein the privacy control circuit includes a comparator configured to compare the state of the first circuit trace to the state of the second circuit trace.

9. The camera system of claim 1, wherein the privacy control circuit is further configured to activate the optical camera blocker in response to a user activation input.

10. The camera system of claim 1, wherein the optical camera blocker includes a liquid crystal film, and wherein activation of the optical camera blocker increases an opacity of the liquid crystal film.

11. The camera system of claim 1, wherein the optical camera blocker includes a plurality of particles dispersed within a liquid chamber, and wherein activation of the optical camera blocker changes a distribution of the particles in the liquid chamber.

12. The camera system of claim 1, wherein the optical camera blocker includes a dynamically controllable electro-optic lens that, when activated, changes a focus applied to light entering the camera from the external environment.

13. The camera system of claim 1, wherein the privacy indicator includes a light emitting diode (LED).

14. A method for camera privacy control, the method comprising:
- at a privacy control circuit of a camera system, comparing a state of a first circuit trace indicative of an intended operational status of a privacy indicator with a state of a second circuit trace indicative of an actual operational status of the privacy indicator, wherein the privacy indicator is configured to indicate an activation status of a camera;
- detecting a mismatch between the state of the first circuit trace and the state of the second circuit trace; and activating an optical camera blocker of the camera system disposed between the camera and an external environment, the optical camera blocker configured to, when activated, obscure images captured by the camera.

15. The method of claim 14, wherein the privacy control circuit includes a system controller configured to control the state of the first circuit trace, and includes a privacy controller configured to control the state of the second circuit trace.

16. The method of claim 15, wherein, upon detecting a first rising edge after a reset condition at a power input interconnect of the privacy controller, the privacy controller waits to supply power to the camera until after a predetermined delay has elapsed.

17. The method of claim 14, wherein the optical camera blocker includes a liquid crystal film, and wherein activation of the optical camera blocker increases an opacity of the liquid crystal film.

18. The method of claim 14, wherein the optical camera blocker includes a plurality of particles dispersed within a liquid chamber, and wherein activation of the optical camera blocker changes a distribution of the particles in the liquid chamber.

19. The method of claim 14, wherein the optical camera blocker includes a dynamically controllable electro-optic lens that, when activated, changes a focus applied to light entering the camera from the external environment.

20. A camera system, comprising:

a camera;

a privacy light emitting diode (LED) configured to indicate an activation status of the camera;

an optical camera blocker disposed between the camera and an external environment, the optical camera blocker configured to, when activated, obscure images captured by the camera; and a privacy control circuit configured to:

compare a state of a first circuit trace indicative of an intended operational status of the privacy LED with a state of a second circuit trace indicative of an actual operational status of the privacy LED, wherein the privacy control circuit includes a system controller configured to control the state of the first circuit trace, and includes a privacy controller configured to control the state of the second circuit trace; and based at least in part on detecting a mismatch between the state of the first circuit trace and the state of the second circuit trace, activate the optical camera blocker.

* * * * *